US008333657B1

(12) United States Patent
Nelson et al.

(10) Patent No.: US 8,333,657 B1
(45) Date of Patent: Dec. 18, 2012

(54) GAMING SYSTEM, GAMING DEVICE AND METHOD FOR DISPLAYING MULTIPLE CONCURRENT GAMES USING DYNAMIC FOCAL POINTS

(75) Inventors: Dwayne R. Nelson, Las Vegas, NV (US); Jonathan Quitt, Reno, NV (US); Warner Cockerille, Sparks, NV (US); Christopher D. Carlisle, Reno, NV (US); Andrew Kertesz, Henderson, NV (US); Suzanne O'Rourke, Reno, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 13/245,264

(22) Filed: Sep. 26, 2011

(51) Int. Cl.
*A63F 9/24* (2006.01)
(52) U.S. Cl. .......................................... 463/27; 463/26
(58) Field of Classification Search .................. 463/27, 463/26, 25
See application file for complete search history.

(56) References Cited

U.S. PATENT DOCUMENTS

| | | | |
|---|---|---|---|
| 4,092,527 A | 5/1978 | Luecke | |
| 4,624,459 A | 11/1986 | Kaufman | |
| 4,680,429 A | 7/1987 | Murdock et al. | |
| 4,856,787 A | 8/1989 | Itkis | |
| 4,897,651 A | 1/1990 | Demonte | |
| 5,033,744 A | 7/1991 | Bridgeman et al. | |
| 5,134,505 A | 7/1992 | Tanaka et al. | |
| 5,233,167 A | 8/1993 | Markman et al. | |
| 5,278,362 A | 1/1994 | Ohashi | |
| 5,342,047 A | 8/1994 | Heidel et al. | |
| 5,393,057 A | 2/1995 | Marnell, II | |
| 5,632,679 A | 5/1997 | Tremmel | |
| 5,695,402 A | 12/1997 | Stupak | |
| 5,766,074 A | 6/1998 | Cannon et al. | |
| 5,769,716 A | 6/1998 | Saffari et al. | |
| 5,770,533 A | 6/1998 | Franchi | |
| 5,770,914 A | 6/1998 | Pease et al. | |
| 5,796,389 A | 8/1998 | Bertram et al. | |
| 5,833,536 A | 11/1998 | Davids et al. | |
| 5,833,537 A | 11/1998 | Barrie | |

(Continued)

FOREIGN PATENT DOCUMENTS

AU           738686        3/1999

(Continued)

OTHER PUBLICATIONS

LED Status Indicator Panels, D.G. Controls Limited, printed on May 15, 2001.

(Continued)

*Primary Examiner* — Pierre E Elisca
(74) *Attorney, Agent, or Firm* — Neal, Gerber & Eisenberg LLP

(57) ABSTRACT

The gaming system disclosed herein changes the focal point of a display device at different points in time to assist the player in focusing on different simultaneously or concurrently played games at different points in time. Specifically, the gaming system displays a plurality of simultaneously or concurrently played games on a display device. In response to a designated event occurring in association with a specific one of the plurality of simultaneously or concurrently played games, the gaming system changes the focal point of the display device to draw the player's focus or attention to that specific one of the simultaneously or concurrently played games. Put differently, the gaming system dynamically allocates and/or indicates different portions of a display device to different simultaneously or concurrently played games at different points in time to account for different events occurring in such simultaneously or concurrently played games.

32 Claims, 9 Drawing Sheets

U.S. PATENT DOCUMENTS

| | | | |
|---|---|---|---|
| 5,951,397 A | 9/1999 | Dickinson |
| 5,964,463 A | 10/1999 | Moore, Jr. |
| 5,980,384 A | 11/1999 | Barrie |
| 6,004,207 A | 12/1999 | Wilson, Jr. et al. |
| 6,012,982 A | 1/2000 | Piechowiak et al. |
| 6,014,131 A | 1/2000 | Barry et al. |
| 6,015,346 A | 1/2000 | Bennett |
| 6,089,976 A | 7/2000 | Schneider et al. |
| 6,102,394 A | 8/2000 | Wurz et al. |
| 6,117,010 A | 9/2000 | Canterbury et al. |
| 6,159,097 A | 12/2000 | Gura |
| 6,159,098 A | 12/2000 | Slomiany et al. |
| 6,174,233 B1 | 1/2001 | Sunaga et al. |
| 6,190,255 B1 | 2/2001 | Thomas et al. |
| 6,201,532 B1 | 3/2001 | Tode et al. |
| 6,203,430 B1 | 3/2001 | Walker et al. |
| 6,210,279 B1 | 4/2001 | Dickinson |
| 6,231,442 B1 | 5/2001 | Mayeroff |
| 6,234,897 B1 | 5/2001 | Frohm et al. |
| 6,254,481 B1 | 7/2001 | Jaffe |
| 6,261,177 B1 | 7/2001 | Bennett |
| 6,270,411 B1 | 8/2001 | Gura et al. |
| 6,309,300 B1 | 10/2001 | Glavich |
| 6,315,664 B1 | 11/2001 | Baerlocher et al. |
| 6,346,043 B1 | 2/2002 | Colin et al. |
| 6,347,795 B1 | 2/2002 | De Leljer |
| 6,347,996 B1 | 2/2002 | Gilmore et al. |
| 6,358,147 B1 | 3/2002 | Jaffe et al. |
| 6,364,767 B1 | 4/2002 | Brossard et al. |
| 6,368,213 B1 | 4/2002 | Mcnabola |
| 6,368,216 B1 | 4/2002 | Hedrick et al. |
| 6,379,245 B2 | 4/2002 | De Keller |
| 6,409,595 B1 | 6/2002 | Uihlein et al. |
| 6,419,578 B1 | 7/2002 | Moody et al. |
| 6,422,940 B1 | 7/2002 | Walker et al. |
| 6,429,846 B2 | 8/2002 | Rosenberg et al. |
| 6,439,995 B1 | 8/2002 | Hughs-Baird et al. |
| 6,443,837 B1 | 9/2002 | Jaffe et al. |
| 6,454,649 B1 | 9/2002 | Mattice et al. |
| 6,464,582 B1 | 10/2002 | Baerlocher et al. |
| 6,533,273 B2 | 3/2003 | Cole et al. |
| 6,569,018 B2 | 5/2003 | Jaffe |
| 6,573,913 B1 | 6/2003 | Butler et al. |
| 6,612,574 B1 | 9/2003 | Cole et al. |
| 6,612,575 B1 | 9/2003 | Cole et al. |
| 6,652,378 B2 | 11/2003 | Cannon et al. |
| 6,656,040 B1 | 12/2003 | Brosnan et al. |
| 6,656,041 B1 | 12/2003 | Kaminkow et al. |
| 6,666,766 B2 | 12/2003 | Baerlocher et al. |
| 6,690,363 B2 | 2/2004 | Newton |
| 6,692,353 B2 | 2/2004 | Walker et al. |
| 6,695,696 B1 | 2/2004 | Kaminkow |
| 6,717,556 B2 | 4/2004 | Asahi et al. |
| 6,731,313 B1 | 5/2004 | Kaminkow |
| 6,738,049 B2 | 5/2004 | Kiser et al. |
| 6,798,359 B1 | 9/2004 | Ivancic |
| 6,819,315 B2 | 11/2004 | Toepke et al. |
| 6,832,957 B2 | 12/2004 | Falconer |
| 6,843,723 B2 | 1/2005 | Joshi |
| 6,860,810 B2 | 3/2005 | Cannon et al. |
| 6,890,254 B2 | 5/2005 | Kaminkow |
| 6,932,706 B1 | 8/2005 | Kaminkow |
| 6,939,226 B1 | 9/2005 | Joshi |
| 6,942,571 B1 | 9/2005 | Mcallister et al. |
| 6,960,136 B2 | 11/2005 | Joshi et al. |
| 6,964,609 B2 | 11/2005 | Haag et al. |
| 6,974,385 B2 | 12/2005 | Joshi et al. |
| 6,991,543 B2 | 1/2006 | Joshi |
| 7,008,319 B2 | 3/2006 | Montgomery et al. |
| 7,011,581 B2 | 3/2006 | Cole et al. |
| 7,067,754 B2 | 6/2006 | Weston et al. |
| 7,229,351 B2 | 6/2007 | Haag et al. |
| 7,238,109 B2 | 7/2007 | Mcgahn et al. |
| 7,331,868 B2 | 2/2008 | Beaulieu et al. |
| 7,455,586 B2 | 11/2008 | Nguyen et al. |
| 7,476,153 B2 * | 1/2009 | Walker et al. .................. 463/20 |
| 7,479,063 B2 | 1/2009 | Pryzby et al. |
| 7,481,710 B2 | 1/2009 | Kaminkow |
| 7,513,828 B2 | 4/2009 | Nguyen et al. |
| 7,775,881 B2 | 8/2010 | Griswold et al. |
| 7,901,294 B2 | 3/2011 | Walker et al. |
| 2002/0151360 A1 | 10/2002 | Durham et al. |
| 2002/0173354 A1 | 11/2002 | Winans et al. |
| 2003/0006174 A1 | 1/2003 | Harres et al. |
| 2003/0050117 A1 | 3/2003 | Silva et al. |
| 2003/0100359 A1 | 5/2003 | Loose et al. |
| 2003/0216173 A1 | 11/2003 | Gauselmann |
| 2004/0018877 A1 | 1/2004 | Tastad et al. |
| 2004/0038721 A1 | 2/2004 | Wells |
| 2004/0038725 A1 | 2/2004 | Kaminkow |
| 2004/0043815 A1 | 3/2004 | Kaminkow |
| 2004/0082373 A1 | 4/2004 | Cole et al. |
| 2004/0118669 A1 | 6/2004 | Mou |
| 2004/0198489 A1 | 10/2004 | Kaminkow et al. |
| 2005/0032568 A1 | 2/2005 | Griswold et al. |
| 2005/0049048 A1 | 3/2005 | Wilder et al. |
| 2005/0050005 A1 | 3/2005 | Ivancic |
| 2005/0059458 A1 | 3/2005 | Griswold et al. |
| 2005/0071023 A1 | 3/2005 | Gilliland et al. |
| 2005/0096121 A1 | 5/2005 | Gilliland et al. |
| 2005/0113163 A1 | 5/2005 | Mattice et al. |
| 2005/0176498 A1 | 8/2005 | Nguyen |
| 2005/0181860 A1 | 8/2005 | Nguyen et al. |
| 2005/0187011 A1 | 8/2005 | Kaminkow |
| 2005/0230233 A1 | 10/2005 | Hoehne et al. |
| 2006/0009280 A1 | 1/2006 | Joshi et al. |
| 2006/0009286 A1 | 1/2006 | Durham et al. |
| 2006/0040723 A1 | 2/2006 | Baerlocher et al. |
| 2006/0040732 A1 | 2/2006 | Baerlocher et al. |
| 2006/0040733 A1 | 2/2006 | Baerlocher et al. |
| 2006/0040734 A1 | 2/2006 | Baerlocher et al. |
| 2006/0040736 A1 | 2/2006 | Baerlocher et al. |
| 2006/0073872 A1 | 4/2006 | Jensen et al. |
| 2006/0094509 A1 | 5/2006 | Michaelson et al. |
| 2006/0121972 A1 | 6/2006 | Walker et al. |
| 2006/0166728 A1 | 7/2006 | Cornell et al. |
| 2006/0178186 A1 | 8/2006 | Lind |
| 2006/0189387 A1 | 8/2006 | Rigsby et al. |
| 2006/0211494 A1 | 9/2006 | Helfer |
| 2006/0247047 A1 | 11/2006 | Mitchell et al. |
| 2006/0252542 A1 | 11/2006 | Nicely |
| 2006/0276245 A1 * | 12/2006 | Walker et al. .................. 463/20 |
| 2006/0287070 A1 * | 12/2006 | Walker et al. .................. 463/25 |
| 2007/0060246 A1 | 3/2007 | Baerlocher et al. |
| 2007/0060314 A1 | 3/2007 | Baerlocher et al. |
| 2007/0060321 A1 | 3/2007 | Vasquez et al. |
| 2007/0077981 A1 | 4/2007 | Hungate et al. |
| 2007/0105615 A1 | 5/2007 | Lind |
| 2007/0105619 A1 | 5/2007 | Kniesteadt et al. |
| 2007/0129131 A1 | 6/2007 | Kaminkow et al. |
| 2007/0142113 A1 * | 6/2007 | Walker et al. .................. 463/42 |
| 2007/0155480 A1 | 7/2007 | Brosnan et al. |
| 2007/0191088 A1 | 8/2007 | Breckner et al. |
| 2007/0218975 A1 | 9/2007 | Iddings et al. |
| 2007/0232377 A1 | 10/2007 | Haag et al. |
| 2007/0243925 A1 | 10/2007 | Lemay et al. |
| 2007/0243928 A1 | 10/2007 | Iddings |
| 2007/0243934 A1 | 10/2007 | Little et al. |
| 2007/0259709 A1 | 11/2007 | Kelly et al. |
| 2007/0293293 A1 | 12/2007 | Baerlocher et al. |
| 2007/0298857 A1 | 12/2007 | Schlottmann et al. |
| 2008/0009334 A1 | 1/2008 | Walker et al. |
| 2008/0009344 A1 | 1/2008 | Graham et al. |
| 2008/0020832 A1 | 1/2008 | Iddings et al. |
| 2008/0020833 A1 | 1/2008 | Baerlocher et al. |
| 2008/0020834 A1 | 1/2008 | Breckner et al. |
| 2008/0020846 A1 | 1/2008 | Vasquez et al. |
| 2008/0020847 A1 | 1/2008 | Kniesteadt et al. |
| 2008/0039195 A1 | 2/2008 | Luciano, Jr. et al. |
| 2008/0045344 A1 | 2/2008 | Schlottmann et al. |
| 2008/0064502 A1 | 3/2008 | Schlottmann et al. |
| 2008/0070676 A1 | 3/2008 | Baerlocher et al. |
| 2008/0070677 A1 | 3/2008 | Baerlocher et al. |
| 2008/0070678 A1 | 3/2008 | Baerlocher et al. |
| 2008/0076496 A1 | 3/2008 | Baerlocher et al. |
| 2008/0076531 A1 | 3/2008 | Baerlocher et al. |
| 2008/0076532 A1 | 3/2008 | Graham et al. |

| | | |
|---|---|---|
| 2008/0076534 A1 | 3/2008 | Iddings et al. |
| 2008/0076542 A1 | 3/2008 | Iddings et al. |
| 2008/0076576 A1 | 3/2008 | Graham et al. |
| 2008/0081690 A1 | 4/2008 | Baerlocher et al. |
| 2008/0081691 A1 | 4/2008 | Baerlocher et al. |
| 2008/0085771 A1 | 4/2008 | Iddings et al. |
| 2008/0085772 A1 | 4/2008 | Iddings et al. |
| 2008/0096650 A1 | 4/2008 | Baerlocher |
| 2008/0102916 A1 | 5/2008 | Kovacs et al. |
| 2008/0108411 A1 | 5/2008 | Jensen et al. |
| 2008/0108423 A1 | 5/2008 | Benbrahim et al. |
| 2008/0113763 A1 | 5/2008 | Michaelson et al. |
| 2008/0113771 A1 | 5/2008 | Baerlocher et al. |
| 2008/0125219 A1 | 5/2008 | Williams et al. |
| 2008/0139274 A1 | 6/2008 | Baerlocher |
| 2008/0139290 A1 | 6/2008 | Kniesteadt et al. |
| 2008/0139297 A1 | 6/2008 | Beaulieu et al. |
| 2008/0153564 A1 | 6/2008 | Baerlocher et al. |
| 2008/0153566 A1 | 6/2008 | Kovacic et al. |
| 2008/0171602 A1 | 7/2008 | Patel et al. |
| 2008/0254881 A1 | 10/2008 | Lutnick et al. |
| 2008/0268948 A1 | 10/2008 | Boesen |
| 2008/0268958 A1 | 10/2008 | Walker et al. |
| 2009/0104954 A1 | 4/2009 | Weber et al. |
| 2009/0111574 A1 | 4/2009 | Rowe |
| 2009/0176568 A1 | 7/2009 | Reddy et al. |
| 2009/0176572 A1 | 7/2009 | Reddy et al. |
| 2009/0197659 A1 | 8/2009 | Christensen |
| 2009/0233705 A1 | 9/2009 | LeMay et al. |
| 2009/0280904 A1 | 11/2009 | Nicely et al. |
| 2010/0120486 A1 | 5/2010 | DeWaal et al. |

FOREIGN PATENT DOCUMENTS

| | | |
|---|---|---|
| EP | 0 232 137 | 8/1987 |
| EP | 0 789 338 | 8/1997 |
| EP | 0 886 250 | 12/1998 |
| EP | 1 025 886 | 8/2000 |
| GB | 2 072 395 | 9/1981 |
| GB | 2 251 112 | 6/1992 |
| WO | WO 85 01596 | 4/1985 |
| WO | WO 94 24683 | 10/1994 |
| WO | WO 97 27570 | 7/1997 |
| WO | WO 98 00207 | 1/1998 |

OTHER PUBLICATIONS

Multi-Color Poly-Leds™, Lumex Product Gallery, printed on Aug. 22, 2001.

Dot Matrix Displays, Lumex Product Gallery, printed on Aug. 22, 2001.

LED lights, topbulb, printed on Aug. 22, 2001.

Gaming & Amusement advertisement, written by Starpoint Electronics Ltd., available prior to Aug. 22, 2002.

Video King Tab-e brochure printed from http://www.videokingnetwork.com/product.asp?id=84 on Sep. 12, 2011.

Video King Power Touch Terminal brochure printed from http://www.videokingnetwork.com/product.asp?id=19 on Sep. 12, 2011.

\* cited by examiner

GAMING SYSTEM, GAMING DEVICE AND METHOD FOR DISPLAYING MULTIPLE CONCURRENT GAMES USING DYNAMIC FOCAL POINTS

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate a primary or base game. Certain known gaming machines enable a player to wager on and play a plurality of primary or base games simultaneously. In many of these gaming machines, the award for each played primary game is based on the player obtaining a winning symbol or symbol combination and on the amount of the wager placed on that primary game (e.g., the higher the wager, the higher the award). Generally, symbols or symbol combinations which are less likely to occur usually provide higher awards.

Gaming machines which provide secondary or bonus games are also known. The secondary or bonus games usually provide an additional award, such as a bonus award, to the player. Secondary or bonus games usually do not require an additional wager by the player to be activated. Instead, secondary or bonus games are generally activated or triggered upon an occurrence of a designated triggering symbol or triggering symbol combination in a primary or base game. For instance, a bonus symbol occurring on the payline on the third reel of a three reel slot machine may trigger a secondary bonus game. When a secondary or bonus game is triggered, the gaming machine generally indicates this triggering to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be).

Certain known gaming machines display each played primary game and any bonus or secondary games on a primary display. Other known gaming machines display each played primary game on the primary display and any bonus or secondary games on a secondary display. In these known gaming machines, when a plurality of primary games and/or secondary games are simultaneously displayed to the player at one time on one display device, the total amount of information displayed in association with these multiple displayed games confuses certain players. Moreover, because different events may or may not be occurring in the different simultaneously played games at different points in time, certain players are unsure of where to look and worry about missing one or more displayed events in one or more of the displayed games.

Accordingly, there is a continuing need to provide new and different gaming machines and gaming systems as well as new and different ways to display games including primary games and secondary games.

SUMMARY

The present disclosure relates generally to gaming systems, gaming devices, and methods for displaying multiple concurrent games using dynamic focal points.

In various embodiments, the gaming system, gaming device and method disclosed herein changes the focal point of a display device at different points in time to assist the player in focusing on different simultaneously or concurrently played games at different points in time. Specifically, the gaming system displays a plurality of simultaneously, concurrently or overlapping played games on a display device. In response to a designated event occurring in association with a specific one of the plurality of simultaneously or concurrently played games, the gaming system changes the focal point of the display device to draw the player's focus or attention to that specific one of the simultaneously or concurrently played games. Put differently, the gaming system and method disclosed herein dynamically allocates and/or indicates different portions of a display device to different simultaneously or concurrently played games at different points in time to account for different events occurring in such simultaneously or concurrently played games. Such a configuration increases a player's enjoyment and excitement by aiding or otherwise assisting the player in determining which of the plurality of simultaneously or concurrently played games to view or otherwise focus on at different points in time.

In one embodiment, the gaming system concurrently or substantially concurrently displays a plurality of plays of a plurality of games to a player utilizing a display device, such as a primary display device. In one such embodiment, the plurality of displayed games have different game cycle times. For example, one of the displayed games is an individual slot game having a first game cycle of a first amount of time while another of the displayed games is a community card game having a different, second game cycle of a second, different amount of time. Such different game cycle amounts of time provides that different events which require the player's attention are occurring in the different games at different points in time.

The gaming system monitors the plurality of concurrently played games to determine if a display reconfiguration event occurs in association with any of the played games. In one such embodiment, a display reconfiguration event occurs when an input is required by a player in one of the games, such as when the player is required to take an action in a community card game. In another such embodiment, a display reconfiguration event occurs when an outcome is displayed in one of the games, such as when all of a plurality of reels stop spinning to display a symbol combination in an individual slot game.

Upon an occurrence of a display reconfiguration event, the gaming system determines whether the current configuration of how the plurality of concurrently played games are displayed corresponds with the display reconfiguration event which occurred. That is, the gaming system determines whether the current configuration of how the game display area of the display device is utilized to simultaneously display the plurality of games adequately draws the player's focus or attention to the event or events occurring in a specific one of the plurality of games played.

If the current configuration of how the plurality of concurrently played games are displayed corresponds with the display reconfiguration event which occurred, the gaming system does not modify or alter how any of the plurality of concurrently played games are displayed. For example, if the display reconfiguration event is a display of a symbol combination in a play of a slot game and the current configuration of the display device is already such that the slot game is the focal point of the display device (e.g., the slot game is displayed as a larger game than the other concurrently played games), the gaming system does not modify or alter how the slot game or the other concurrently played games are displayed to the player.

On the other hand, if the current configuration of how the plurality of concurrently played games are displayed does not correspond with the display reconfiguration event which occurred, the gaming system reconfigures or modifies how one or more of the concurrently displayed games are displayed to the player. In one such embodiment, the gaming system reconfigures or modifies how one or more of the displayed games are displayed to the player by scaling the displayed size of the plurality of concurrently played games. In this embodiment, the gaming system modifies which of such games are allocated a first portion of the game display area (i.e., the available space of the display device) and which of such games are allocated a second, smaller portion of the game display area. For example, if the display reconfiguration event is a need for a player's input in a bonus game triggered in association with a play of a slot game and the current configuration of the display device is that a community card game is the focal point of the display device (e.g., the community card game is displayed as a larger game than the individual slot game, thus drawing the player's attention to the community card game), the gaming system modifies or alters how the concurrently played games are displayed by scaling the slot game and the community card game such that the slot game is displayed as a larger game than the community card game. In this example, such scaling of at least the slot game and the community card game is configured to draw the player's attention to the slot game to focus the player on the required input in the triggered bonus game.

After reconfiguring or modifying how one or more of the concurrently displayed games are displayed to the player, the gaming system continues monitoring the plurality of concurrently played games for any subsequent display reconfiguration events and proceeds with possibly reconfiguring how such concurrently played games are displayed to the player.

Accordingly, such a gaming system provides that at a first point in time and in response to an event occurring in association with a first one of a plurality of concurrently played games, the gaming system allocates a first portion of a game play area of a display device to the first one of the concurrently played games and allocates a second, different sized portion of the game play area of the display device to a second one of the concurrently played game. Such a gaming system further provides that at a second, subsequent point in time and in response to an event occurring in association with the second one of a plurality of concurrently played games, the gaming system allocates the first portion of the game play area of the display device to the second one of the concurrently played games and allocates the second, different sized portion of the game play area of the display device to the first one of the concurrently played game. This variable allocation of displaying the different games concurrently being played affectively changes the focal point for the player at different points in time. Such different focal points aid or assist the player in focusing on different games in association with different events occurring in such games which reduces the confusion suffered by certain players to increase the amount of enjoyment and excitement of these players.

Additional features and advantages are described herein, and will be apparent from the following Detailed Description and the figures.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
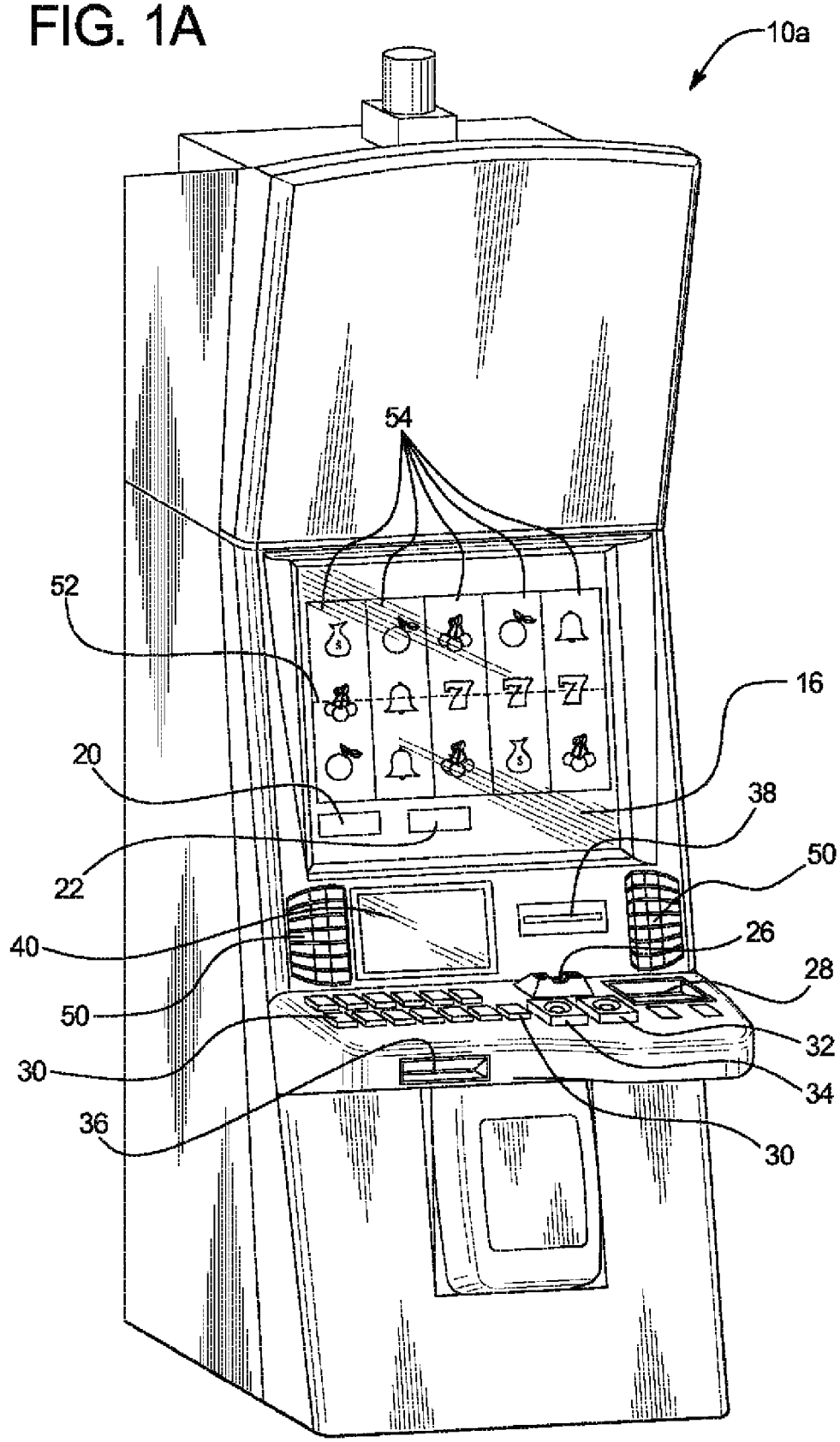
FIG. 1A is a front-side perspective view of one embodiment of the gaming device disclosed herein.
Figure 1B:
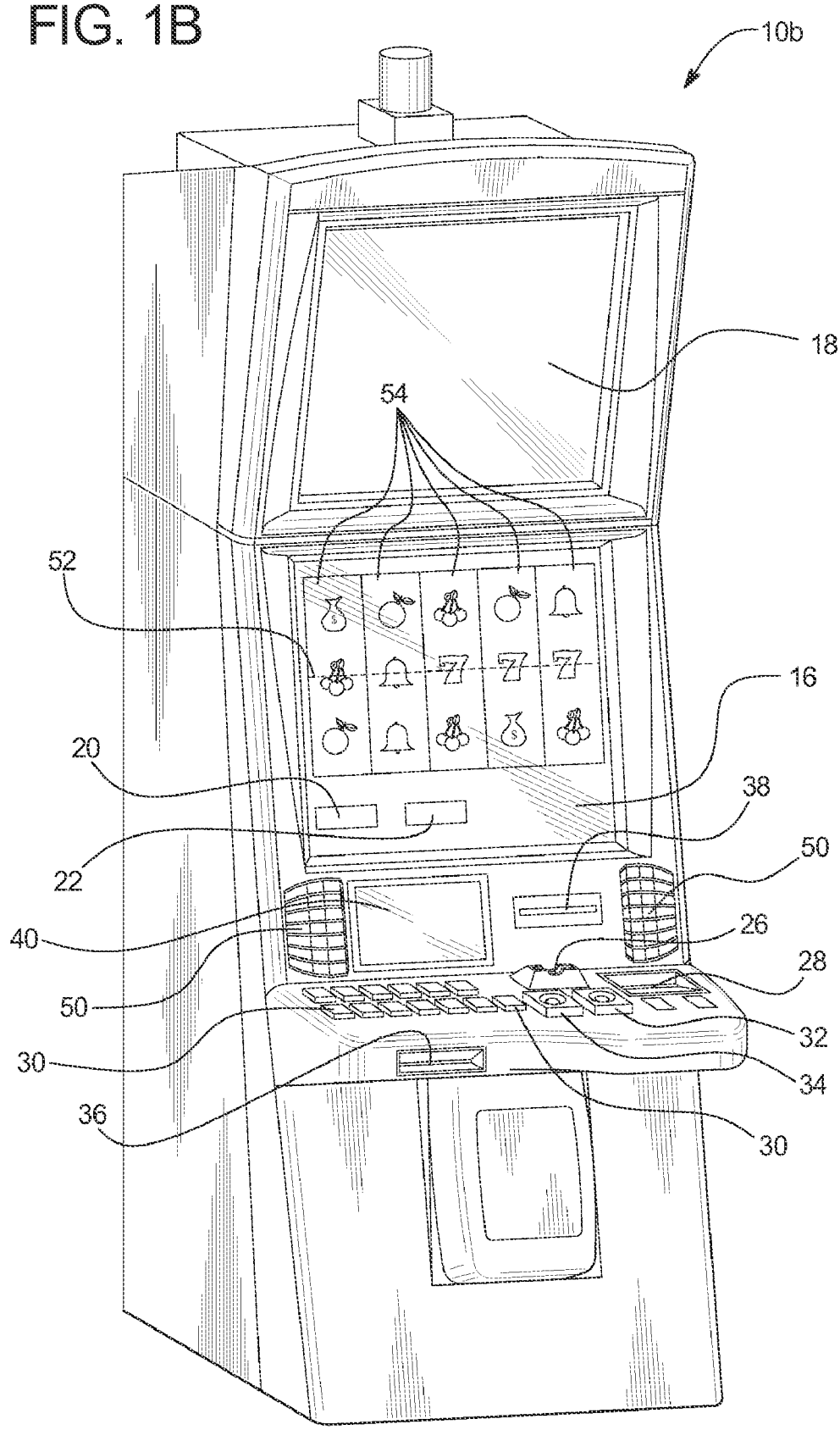
FIG. 1B is a front-side perspective view of another embodiment of the gaming device disclosed herein.

Referring now to the drawings, two example alternative embodiments of a gaming device disclosed herein are illustrated in FIGS. 1A and 1B as gaming device 10a and gaming device 10b, respectively. Gaming device 10a and/or gaming device 10b are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
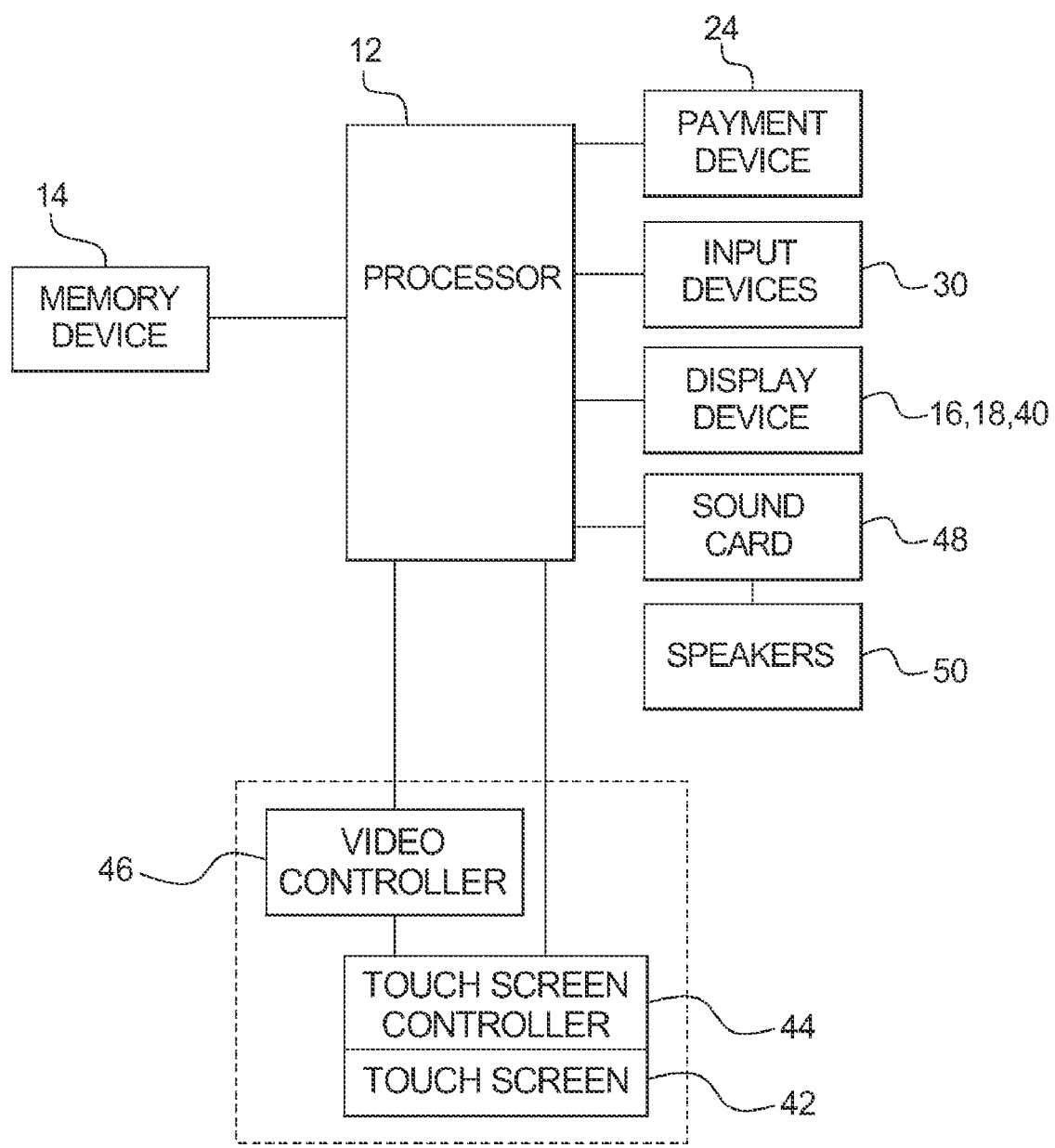
FIG. 2A is a schematic block diagram of the electronic configuration of one embodiment of the gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device.

In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, a non-transitory computer readable medium, or USB memory device. In other embodiments, part or all of the program code and/or operating data described above can be downloaded to the memory device through a suitable network.

In one embodiment, an operator or a player can use such a removable memory device in a desktop computer, a laptop computer, a hand-held device, such as a personal digital assistant (PDA), a portable computing or mobile device, or another computerized platform to implement the present disclosure. In one embodiment, the gaming device or gaming machine disclosed herein is operable over a wireless network, for example as part of a wireless gaming system. In one such embodiment, the gaming machine may be a hand-held device, a mobile device, or any other suitable wireless device that enables a player to play any suitable game at a variety of different locations. In various embodiments in which the gaming device or gaming machine is a hand-held device, a mobile device, or any other suitable wireless device, at least one memory device and at least one processor which control the game or other operations of the hand-held device, mobile device, or other suitable wireless device may be located: (a) at the hand-held device, mobile device or other suitable wireless device; (b) at a central server or central controller; or (c) any suitable combination of the central server or central controller and the hand-held device, mobile device or other suitable wireless device. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to: (i) advertise games or other aspects of the gaming establishment, or (ii) display the specific game (from the plurality of simultaneously played game) which is currently in focus on the central display device. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented. In one embodiment, the disclosed multi-dimensional cascading symbol game is implemented as a base or primary game.

In one embodiment, as illustrated in FIGS. 1A and 1B, a base or primary game may be a slot game with one or more paylines 52. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player.

In one embodiment, one or more of the paylines may be horizontal, vertical, circular, diagonal, angled or any combination thereof. In another embodiment, one or more of the paylines each include a plurality of adjacent symbol display positions on a requisite number of adjacent reels. In one such embodiment, one or more paylines are formed between at least two symbol display positions which are adjacent to each other by either sharing a common side or sharing a common corner (i.e., such paylines are connected paylines). In these embodiments, the gaming device enables a player to wager on one or more of such paylines to activate such wagered on paylines.

In another embodiment wherein one or more paylines are formed between at least two symbol display positions which are adjacent to each other, the gaming device enables a player to wager on and thus activate a plurality of symbol display positions. In this embodiment, one or more paylines which are formed from a plurality of adjacent active symbol display positions on a requisite number of adjacent reels are activated.

In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol display positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol display positions on a first reel by the number of symbols generated in active symbol display positions on a second reel by the number of symbols generated in active symbol display positions on a third reel and so on for each reel of the gaming device with at least one symbol generated in an active symbol display position. For example, a three reel gaming device with three symbols generated in active symbol display positions on each reel includes 27 ways to win (i.e., 3 symbols on the first reel×3 symbols on the second reel×3 symbols on the third reel). A four reel gaming device with three symbols generated in active symbol display positions on each reel includes 81 ways to win (i.e., 3 symbols on the first reel×3 symbols on the second reel×3 symbols on the third reel×3 symbols on the fourth reel). A five reel gaming device with three symbols generated in active symbol display positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol display positions by one or more of the reels modifies the number of ways to win.

In another embodiment, the gaming device enables a player to wager on and thus activate symbol display positions. In one such embodiment, the symbol display positions are on the reels. In this embodiment, if based on the player's wager, a reel is activated, then each of the symbol display positions of that reel will be activated and each of the active symbol display positions will be part of one or more of the ways to win. In one embodiment, if based on the player's wager, a reel is not activated, then a designated number of default symbol display positions, such as a single symbol display position of the middle row of the reel, will be activated and the default symbol display position(s) will be part of one or more of the ways to win. This type of gaming machine enables a player to wager on one, more than one or all of the reels and the processor of the gaming device uses the number of wagered on reels to determine the active symbol display positions and the number of possible ways to win. In alternative embodiments, (1) no symbols are displayed as generated at any of the inactive symbol display positions, or (2) any symbols generated at any inactive symbol display positions may be displayed to the player but suitably shaded or otherwise designated as inactive.

In one embodiment wherein a player wagers on one or more reels, a player's wager of one credit may activate each of the three symbol display positions on a first reel, wherein one default symbol display position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol display positions on a first reel, each of the three symbol display positions on a second reel and each of the three symbol display positions on a third reel wherein one default symbol display position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol display position on a first reel forms part of a winning symbol combination with or is otherwise suitably related to a symbol generated in an active symbol display position on a second reel. In this embodiment, the gaming device classifies each pair of symbols which form part of a winning symbol combination (i.e., each pair of related symbols) as a string of related symbols. For example, if active symbol display positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol display positions (i.e., as opposed to a quantity of awards being based on how many paylines that would have passed through each of the strings of related symbols in active symbol display positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. In one embodiment, the disclosed multi-dimensional cascading symbol game is implemented as a bonus or secondary game. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
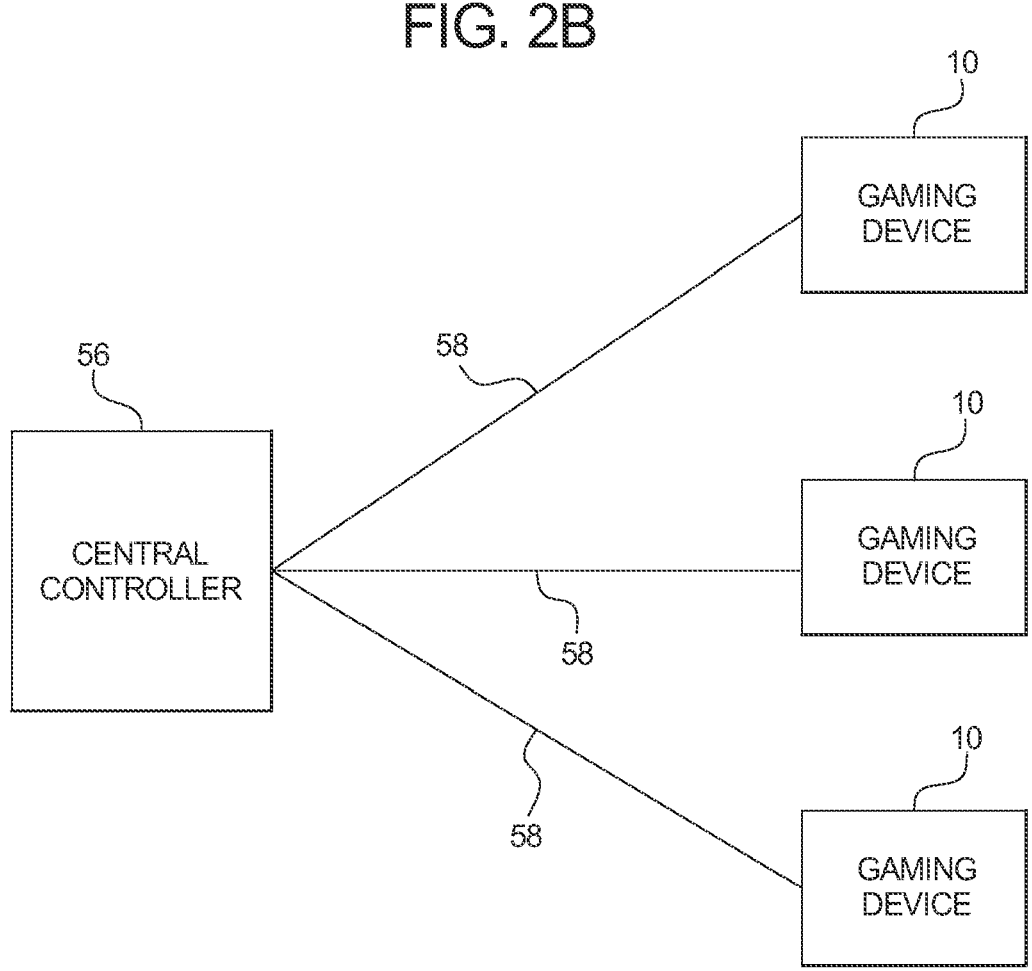
FIG. 2B is a schematic block diagram illustrating a plurality of gaming devices in communication with a central controller.

In one embodiment, as illustrated in FIG. 2B, one or more of the gaming devices 10 are in communication with each other and/or at least one central controller 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, for a group or community cooperation game, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, for a group or community competition game, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Variable Game Display Configurations

Figure 3:
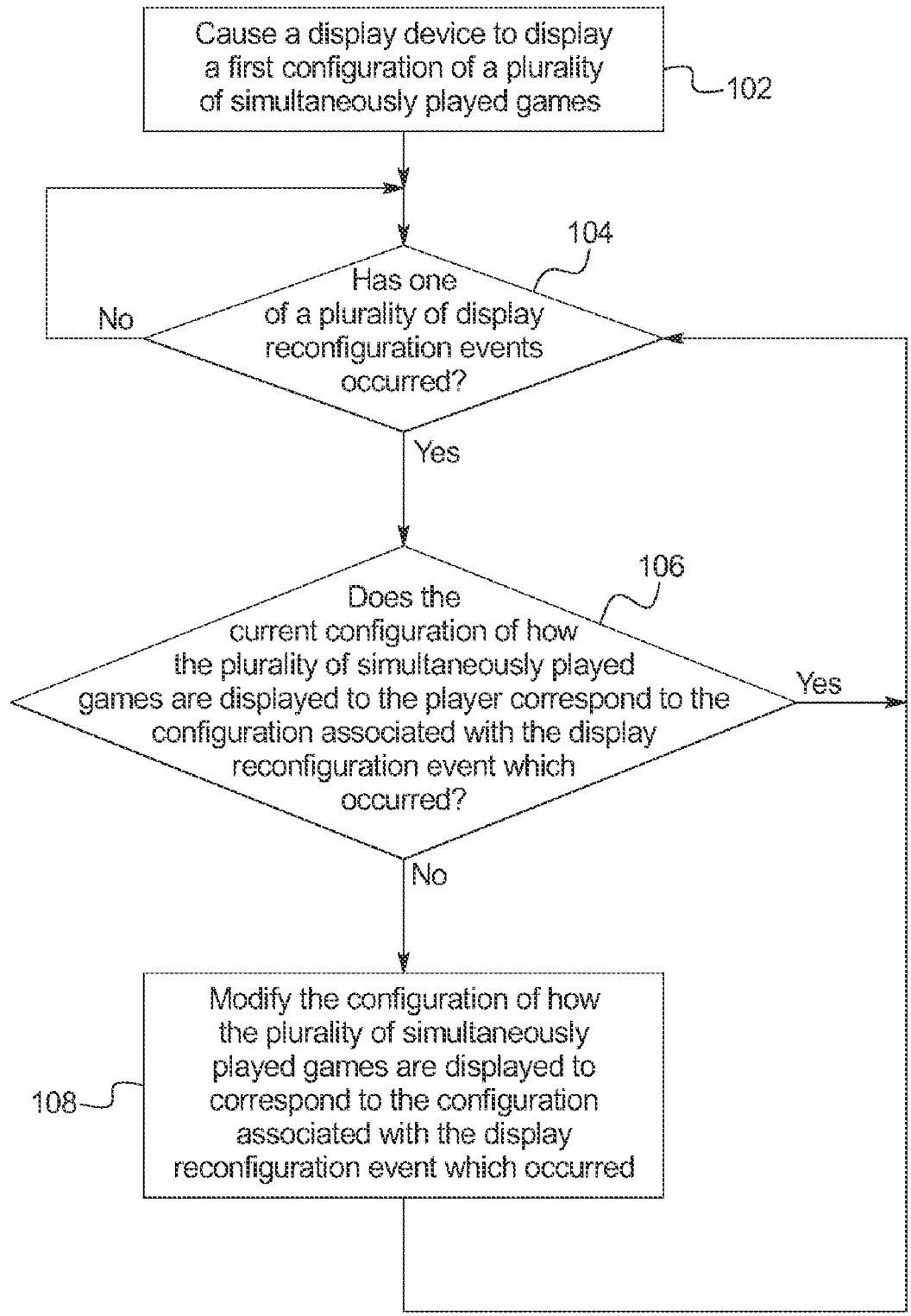
FIG. 3 is a flowchart of one embodiment of the gaming system disclosed herein illustrating a determination of whether to reconfigure a display device based on one or more events occurring in association with one or more concurrently played games.

Referring now to FIG. 3, a flowchart of an example embodiment of a process for operating a gaming system, a gaming server or a gaming device disclosed herein is illustrated. In one embodiment, this process is embodied in one or more software programs stored in one or more memories and executed by one or more processors or one or more servers. Although this process is described with reference to the flowchart illustrated in FIG. 3, it should be appreciated that many other methods of performing the acts associated with this process may be used. For example, the order of certain steps described may be changed, or certain steps described may be optional.

In various embodiments, after initiating a plurality of games for the player to simultaneously play or participate in, as seen in FIG. 3, the gaming system and method disclosed herein causes a display device to display a first configuration of the plurality of simultaneously played games as indicated in block 102.

Figure 4A:
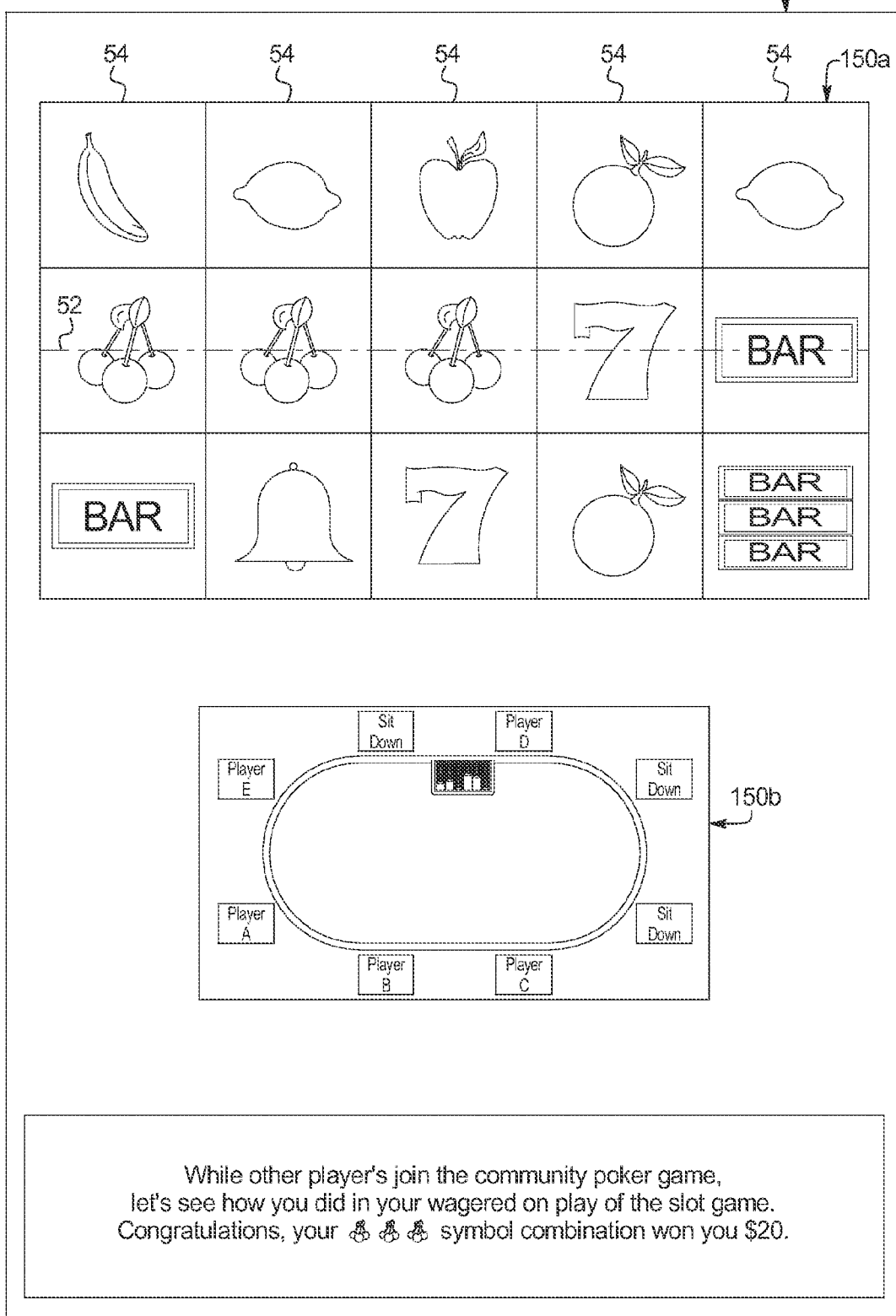
FIGS. 4A and 4B are front views of one example of game play screens of a gaming device disclosed herein illustrating the reconfiguration of a display device based on one or more events occurring in association with one or more concurrently played games.

In one embodiment, the first configuration of the plurality of games displayed to the player includes causing each of the plurality of games to be allocated an equal (or substantially equal) amount of the displayed game play area. In another embodiment, the first configuration of the plurality of games displayed to the player includes causing each of the plurality of games to be allocated different amounts of the displayed game play area. For example, as seen in FIG. 4A, after a player has selected to a play a slot game 150a and selected to participate in a community poker game 150b, the gaming system displays the play of these two games in a first configuration in which the slot game is allocated a greater portion of the displayed game play area. In this illustrated example, the gaming system provides appropriate messages such as "WHILE OTHER PLAYER'S JOIN THE COMMUNITY POKER GAME, LET'S SEE HOW YOU DID IN YOUR WAGERED ON PLAY OF THE SLOT GAME" and "CONGRATULATIONS, YOUR CHERRY-CHERRY-CHERRY SYMBOL COMBINATION WON YOU $20" to the player visually, or through suitable audio or audiovisual displays.

In one embodiment, the gaming system accounts for the different types of games being simultaneously played in determining and displaying a first configuration of the plurality of simultaneously played games. Specifically, the gaming system determines that, based on the characteristics or features of the games being simultaneously played by the player, one or more display reconfiguration events are more likely to occur in certain of the plurality of games. In this embodiment, in anticipation of having to modify the configuration of how the plurality of games are displayed to the player, the gaming system utilizes a first configuration to try and minimize such subsequent modifications. For example, expanding on the illustrated example of FIG. 4A, the gaming system determines that, based on the slot game having a significantly quicker play cycle than the community poker game, the slot game is allocated a greater area or portion of the displayed game play area to (and the community poker game is allocated a lesser area or portion of the displayed game play area). In this example, because the illustrated slot game is completed, on average, within three seconds and the illustrated community poker game is completed, on average, within three minutes (i.e., one-hundred-eighty seconds), the gaming system determines that the player's attention should be predominantly directed to the slot game to repeatedly place wagers, view generated outcome and view any provided awards. Put differently, since sixty slot games are completed, on average, in the amount of time it takes, on average, to complete one community poker game, compared to the community poker game, a greater quantity of events that require the player's attention will occur in the slot game during the time period it takes to complete one community poker game and thus, to focus the player's attention on the slot game, the gaming system determines to allocate a greater portion of the displayed game play area to the slot game.

In addition to displaying the plurality of simultaneously, concurrently or overlapping played games, the gaming system monitors the plays of the plurality of simultaneously played games and determines, as indicated in diamond 104 of FIG. 3, if one of a plurality of display reconfiguration events has occurred. In one embodiment, a display reconfiguration event occurs in association with one or more the displayed events which occur in one of the simultaneously played games. In this embodiment, the gaming system designates one or more displayed events or outcomes which occur in association with one or more of the displayed games as display reconfiguration events.

In one embodiment, each display reconfiguration event is associated with a configuration of how the plurality of games are to be displayed on the display device. That is, one display reconfiguration event is associated with a configuration of how the plurality of games are to be displayed on the display device when that display reconfiguration event occurs and another display reconfiguration event is associated with another, possibly different configuration of how the plurality of games are to be displayed on the display device when that display reconfiguration event occurs. Specifically, each display reconfiguration event is associated with a configuration of one or more of: a location which each of the plurality of simultaneously played games are to be displayed at, a size which each of the plurality of simultaneously played games are to be displayed as, a color which each of the plurality of simultaneously played games are to be displayed as, a brightness or dimming which each of the plurality of simultaneously played games are to be displayed as, and/or any displayed indicators, displayed characteristics or displayed features associated with each of the plurality of simultaneously played games.

If the gaming system determines that a display reconfiguration event has not occurred, the gaming system returns to diamond 104 and continues monitoring the plays of the simultaneously played games to determine if one of the plurality of display reconfiguration events has occurred. That is, if the gaming system determines that no event has occurred in any of the games that requires the player's specific attention, the gaming system continues displaying the plurality of games as described above.

On the other hand, if the gaming system determines that a display reconfiguration event has occurred, the gaming system determines whether the current configuration of how the plurality of simultaneously played games are displayed to the player corresponds to the configuration associated with the display reconfiguration event which occurred as indicated in diamond 106. That is, if the gaming system determines that an event has occurred in at least one of the games that requires the player's attention, the gaming system determines whether the current display configuration of the displayed game play area of the display device is one that already draws the player's attention to the event that occurred.

If the gaming system determines that the current configuration of how the plurality of simultaneously played games are displayed to the player corresponds to the configuration associated with the display reconfiguration event which occurred, the gaming system returns to diamond 104 and continues monitoring the plays of the simultaneously played games to determine if another one of the plurality of display reconfiguration events has occurred. For example, as seen in FIG. 4A, if the gaming system determines that a display reconfiguration event of a generation of a symbol combination in the simultaneously played slot game occurs and the gaming system further determines that the configuration of how the plurality of simultaneously played games are displayed to the player matches the way the plurality of simultaneously played games are currently displayed to the player, the gaming system does not modify the configuration of the display device. Rather, the gaming system continues displaying the plays of the slot game and the community poker game to the player and awaits another display reconfiguration event.

On the other hand, if the gaming system determines that the current configuration of how the plurality of simultaneously played games are displayed to the player does not correspond to the configuration associated with the display reconfiguration event which occurred, the gaming system modifies the configuration of how the plurality of simultaneously played games are displayed to correspond to the configuration associated with the display reconfiguration event which occurred as indicated in block 108 of FIG. 3. That is, if the gaming system determines that the current configuration of how the plurality of simultaneously played games are displayed does not adequately focus the player's attention to a specific one of the games, the gaming system reconfigures how the plurality of simultaneously played games are displayed to focus the player's attention to the specific one of the games. Put differently, by either increasing the display resources attributable to one game and/or decreasing the display resources attributable to the remaining simultaneously played games, the gaming system disclosed herein modifies how such games are displayed to the player in an attempt to increase a player's awareness of one or more events occurring in one game while decreasing the player's awareness of one or more events occurring in the remaining simultaneously played games.

Figure 4B:
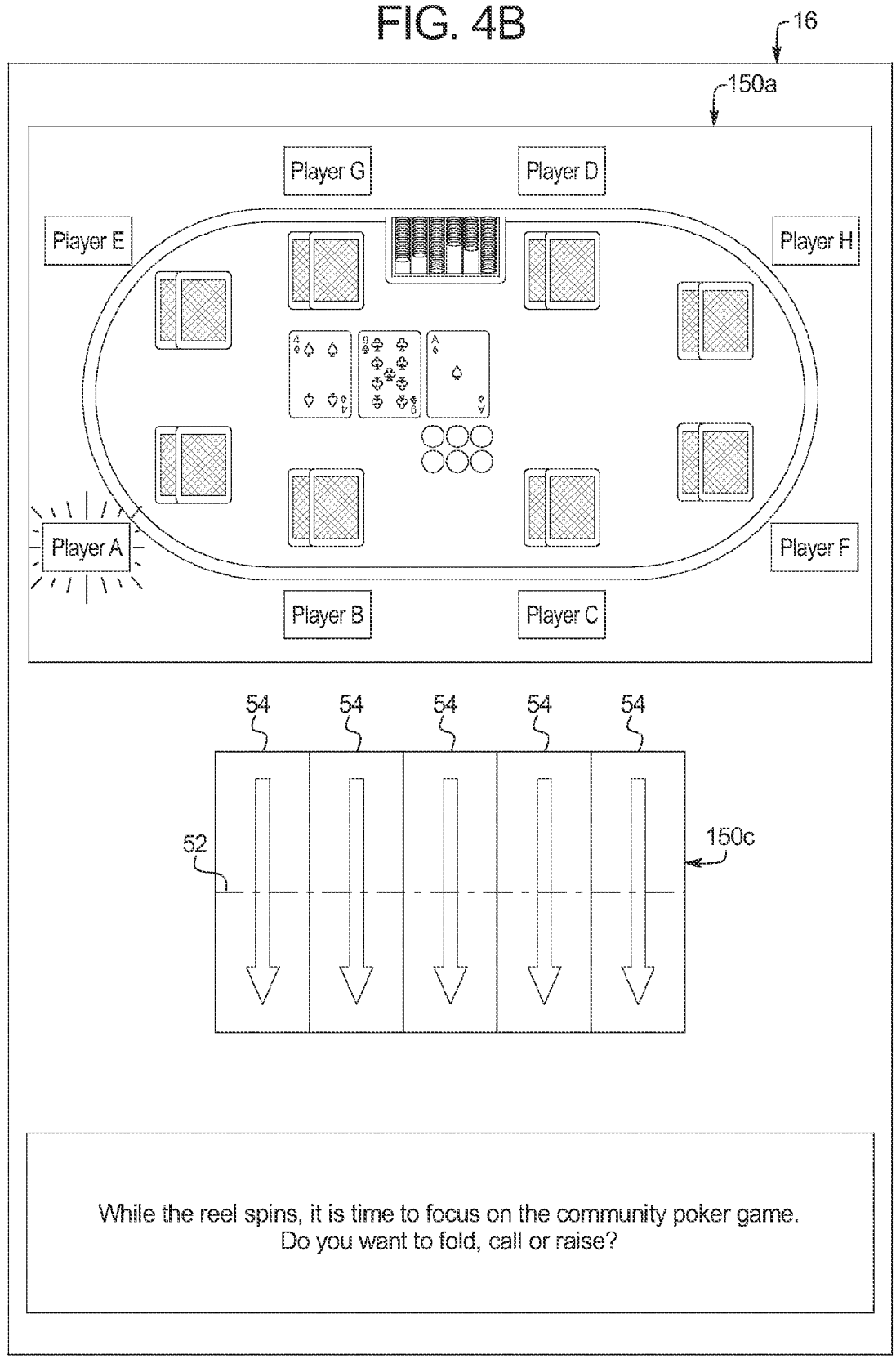

For example, as seen in FIG. 4B, after determining that a display reconfiguration event associated with a turn or opportunity for the player to raise the bet, call the bet or fold occurred in the community poker game, the gaming system modified, altered or otherwise reconfigured the display device by reallocating a greater area of the game play area to the community poker game. That is, the gaming system modified how the slot game and the community poker game are displayed to the player such that the community poker game became the focal point of the display device. In this illustrated example, the gaming system provides appropriate messages such as "WHILE THE REELS SPIN, IT IS TIME TO FOCUS ON THE COMMUNITY POKER GAME" and "DO YOU WANT TO FOLD, CALL OR RAISE?" to the player visually, or through suitable audio or audiovisual displays.

In one embodiment, as illustrated in FIGS. 4A and 4B, the gaming system modifies how the plurality of simultaneously played games are displayed to the player by scaling the respective sizes of the plurality of simultaneously played games. In this embodiment, the gaming system causes the game or games which require the player's attention to become larger (while also causing the game or games which do not require the player's attention to become smaller). In one embodiment, the gaming system preserves or maintains the aspect ratio of the displayed games when scaling the size of one or more of the games played. In another embodiment, the gaming system disregards the aspect ratio of the displayed games when scaling the size of one or more of the games played.

In another embodiment, as illustrated in FIGS. 4A and 4B, the gaming system modifies how the plurality of simultaneously played games are displayed to the player by moving the location of the plurality of simultaneously played games. In this embodiment, the gaming system causes the game or games which require the player's attention to move to one location, such as the top portion of the displayed game play area (while also causing the game or games which do not require the player's attention to move to another location, such as a bottom portion of the displayed game play area).

In another embodiment, the gaming system modifies how the plurality of simultaneously played games are displayed to the player by indicating one or more games to the player while not indicating one or more other games. In one such embodiment, the gaming system highlights or otherwise displays a border around the game or games which require the player's attention (while not highlighting the games that do not require the player's attention). In another such embodiment, the gaming system flashes the game or games which require the player's attention (while not flashing the games that do not require the player's attention). In another such embodiment, the gaming system brightens the game or games which require the player's attention (while not brightening the games that do not require the player's attention). It should be appreciated that such indications of one or more simultaneously played games may be utilized when a plurality of the games each need the player's attention. For example, if, after the gaming system increases the size of a first game (and decreases the size of a second game) to draw the player's attention to the requirement that the player make a selection in the first game, a display reconfiguration event occurs for a second game that requires the player's attention for the second game, the gaming system retains the sizes of both the first and second games and utilizes an alternative indicator to also draw the player's attention to the second game, such as a flashing of the second game.

In another embodiment, the gaming system modifies how the plurality of simultaneously played games are displayed to the player by removing the player's focus from one or more of the plurality of simultaneously played games. In one such embodiment, the gaming system cause the game or games which do not require the player's attention to be grayed out or blurred (while also causing the game or games which require the player's attention to remain in focus). It should be appreciated that in one embodiment, removing focus is used if the player is waiting on that game. For example if the player is waiting in a game lobby for a communal poker table to fill up, that communal poker game is blurred out while the player is waiting and the community poker game is then maximized when the table is full and the game is ready to continue.

After modifying the configuration of how the plurality of simultaneously played games are displayed to the player, the gaming system returns to diamond 104 and continues monitoring the plays of the simultaneously played games to determine if another one of the plurality of display reconfiguration events has occurred.

Figure 5:
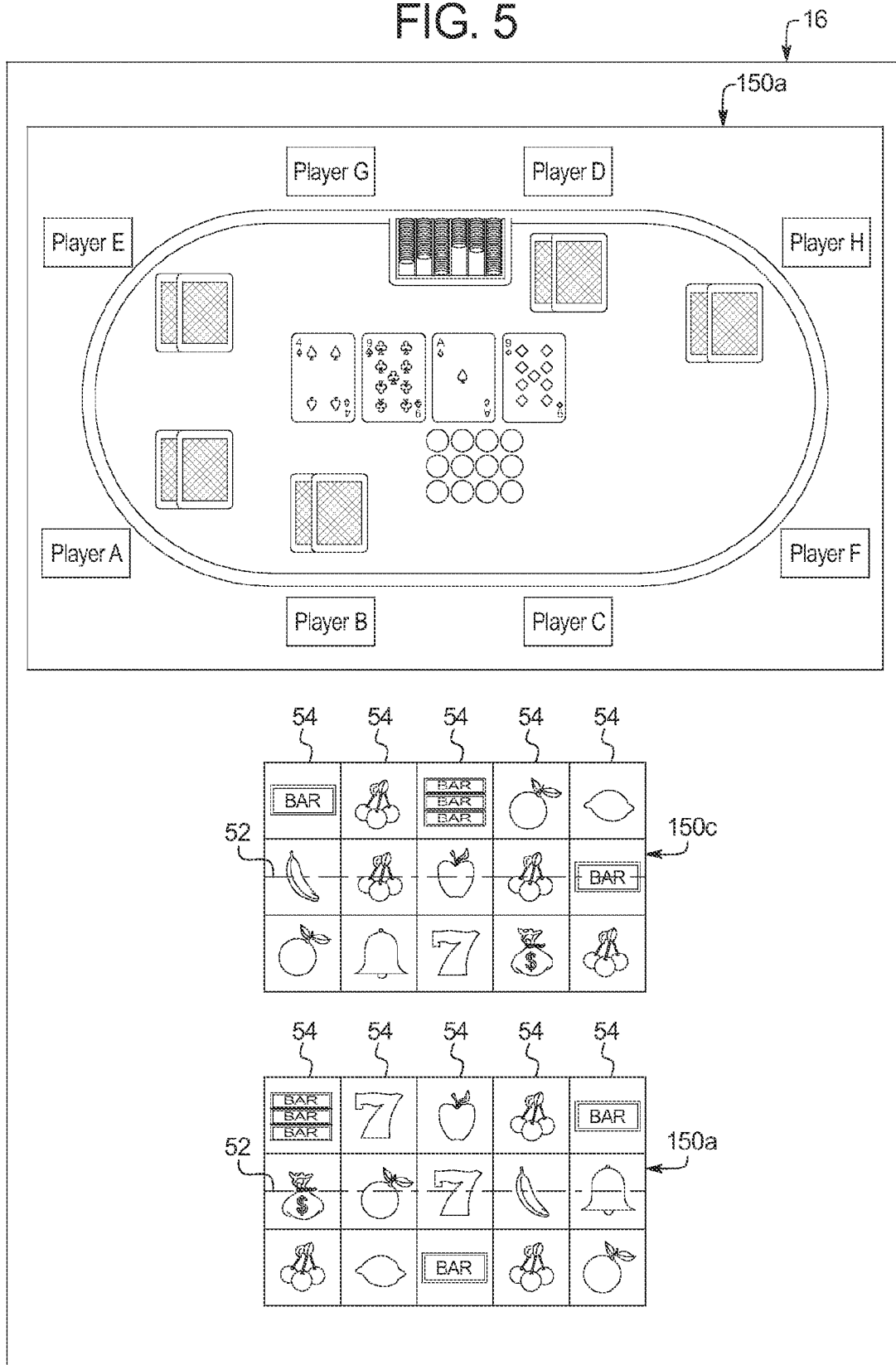
FIG. 5 is a front view of another example of a game play screen of a gaming device disclosed herein illustrating a configuration of how a plurality of concurrently played games are displayed to a player.
Figure 6:
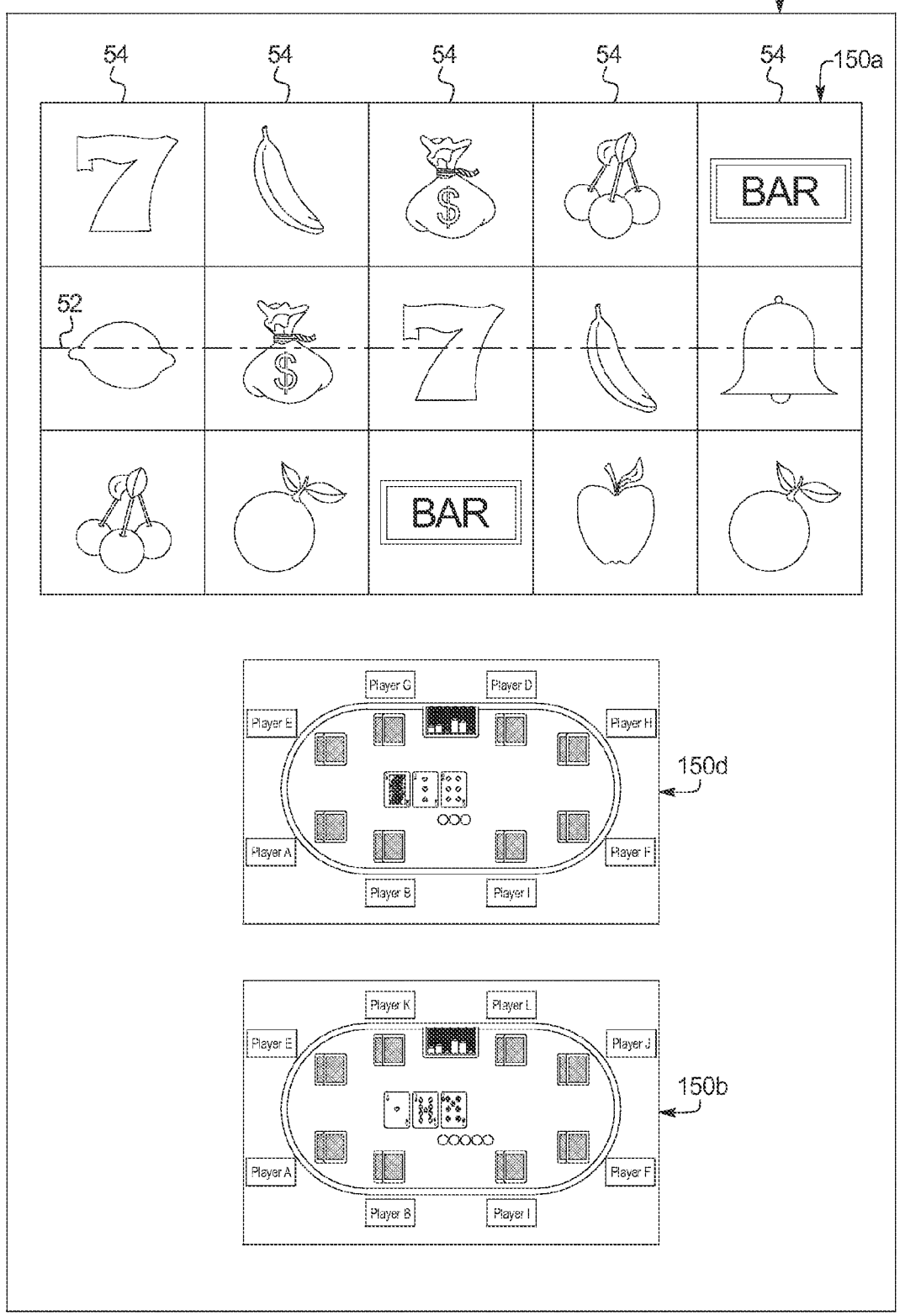
FIG. 6 is a front view of another example of a game play screen of a gaming device disclosed herein illustrating a configuration of how a plurality of concurrently played games are displayed to a player.

In one embodiment, the plurality of simultaneously played games displayed to the player include a plurality of wagered on primary or base games. For example, as seen in FIG. 5, the plurality of simultaneously played games include two slot games 150a and 150c and one community poker game 150b. In another example, as seen in FIG. 6, the plurality of simultaneously played games include one slot game 150a and two community poker games 150c and 150d. In another embodiment, the plurality of simultaneously played games displayed to the player include a plurality of triggered secondary or bonus games. In another embodiment, the plurality of simultaneously played games displayed to the player include at least one wagered on primary game and at least one triggered secondary game.

Any suitable game, type of game or quantity of games may be implemented as one or more of the simultaneously played games disclosed herein. In different embodiments, one or more of the simultaneously played games include, but are not limited to: any suitable slot game, any suitable free spins or free activations game, any suitable wheel game, any suitable card game, any suitable keno game, any suitable bingo game, any suitable die or dice game, any suitable virtual horse racing game; any suitable offer and acceptance game, any suitable award ladder game, any suitable puzzle-type game, any suitable persistence game, any suitable selection game, any suitable cascading symbols game, any suitable ways to win game, any suitable scatter pay game, any suitable elimination game, any suitable group or community cooperation game, any suitable group or community competition game, or any other suitable type of game. It should be appreciated that regardless of which games or types of games are simultaneously played, as described above, each displayed game includes a displayed generation of an outcome for that game and the displaying of any award associated with the generated outcome for that game.

In one embodiment, the display device which displays the plurality of simultaneously played games to the player includes a single display device, such as primary or central display device 16. In another embodiment, the display device which displays the plurality of simultaneously played games to the player includes a plurality of display devices which are linked or otherwise configured to function as a single display device. In this embodiment, while the game play area is caused to be displayed by a plurality of display devices, each of the plurality of simultaneously played games are still displayed in the single game play area.

In one embodiment, each simultaneously played game is associated with one or more display reconfiguration events. In one such embodiment, the plurality of display reconfiguration events associated with an individual game have the same configuration of how the plurality of simultaneously played games are displayed to the player. For example, both: (i) the display reconfiguration event of an elapsed amount of time since the completion of a play of a slot game without the player placing a wager on another play of the slot game, and (ii) the display reconfiguration event of a displayed generation of a symbol combination in the play of the slot game; have the same configuration of how the plurality of simultaneously played games are displayed to the player. In this example, regardless of if the amount of time has elapsed since the completion of a play of a slot game without the player placing a wager on another play of the slot game, or if a symbol combination is generated in the play of the slot game, the gaming system allocates the same portion of the displayed game play area to the slot game.

In another such embodiment, the plurality of display reconfiguration events associated with an individual game have different configurations of how the plurality of simultaneously played games are displayed to the player. For example, the display reconfiguration event of a first elapsed amount of time since the gaming system requested the player to make a wager or fold a hand in a community card game has a first configuration of how the plurality of simultaneously played games are displayed to the player, and the display reconfiguration event of a second elapsed amount of time since the gaming system requested the player to make a wager or fold a hand in a community card game has a second configuration of how the plurality of simultaneously played games are displayed to the player. In this example, the first configuration is associated with allocating a first portion of the displayed game play area to the community card game and the second configuration is associated with allocating a second, greater portion of the displayed game play area to the community card game (i.e., the more time that elapses without the player making the required inputs for the play of the community card game, the larger portion of the game play area is dedicated to the displaying the community card game).

In different embodiments, the display reconfiguration event includes, but is not limited to:
  i. a deposit of an amount of funds at the gaming device;
  ii. an identification of a player;
  iii. an opportunity or turn for a player to place a wager;
  iv. an opportunity for a player to initiate a play of a game;
  v. a player placing a wager (regardless of the wager amount);
  vi. a player placing a side-wager (regardless of the side-wager amount);
  vii. any player placing a wager greater than a designated wager amount;
  viii. any player placing a side wager greater than a designated side wager amount;
  ix. a player wagering on a number of paylines;
  x. a player wagering on a designated payline;
  xi. a player wagering on a number of ways to win;
  xii. a request of a player to place a wager on a play of a game;
  xiii. an amount of time elapsed in which a player has not placed a wager on a play of a game;
  xiv. a player engaging an input device to cause a generation of an outcome;
  xv. a request of a player to engage an input device to cause a generation of an outcome;
  xvi. an amount of time elapsed in which a player has not engaged an input device to cause a generation of an outcome;
  xvii. an activation of a reel (or a designated reel);
  xviii. an activation of a plurality of reels;
  xix. a generation of any outcome (or a designated outcome);
  xx. a generation of any outcome (or a designated outcome) associated with an award;
  xxi. a generation of any outcome (or a designated outcome) associated with an award over a designated value;
  xxii. a generation of an outcome (or a designated outcome) on a designated payline;
  xxiii. a generation of an outcome (or a designated outcome) in a scatter configuration;
  xxiv. a generation of a winning way to win (or a designated winning way to win);
  xxv. a generation of a designated symbol or symbol combination;
  xxvi. a generation of a partial designated symbol combination;
  xxvii. a generation of a designated symbol or symbol combination on a designated payline;
  xxviii. a generation of a designated symbol or symbol combination in a scatter configuration;
  xxix. an accumulation of a designated quantity of symbols or secondary game elements;
  xxx. a triggering of a play of a secondary or bonus game;
  xxxi. an activation of a secondary or bonus display (such as an award generator);
  xxxii. an activation of a community award generator;
  xxxiii. a generation of any outcome (or a designated outcome) in a secondary game;
  xxxiv. a player engaging an input device to make a selection in a game;
  xxxv. a request of a player to engage an input device to make a selection in a game;
  xxxvi. an amount of time elapsed in which a player has not engaged an input device to make a selection in a game;
  xxxvii. an amount of free spins provided;
  xxxviii. an amount of time elapsed;
  xxxix. an amount of time elapsed between games;
  xl. a conclusion of a game;
  xli. an error condition associated with a game (e.g., a gaming device's failure to communicate with a server or another game client);
  xlii. a timeout of a gaming device;
  xliii. a timeout of a game;

xliv. an amount of time elapsed since a conclusion of a game;

xlv. a credit meter reaching a designated amount;

xlvi. a credit meter reaching a designated range of amounts;

xlvii. an occurrence of a chat event;

xlviii. a modification of an award value (e.g., a change of a progressive award value);

xlix. an addition of a game to the plurality of games available to be played;

l. a removal of a game that is currently being played (or available to be played);

li. any event disclosed herein which is tracked for a group of gaming devices;

lii. any event disclosed herein which includes a group of gaming devices working together;

liii. any event disclosed herein which is associated with a group of players working together;

liv. a communication from another player;

lv. a communication from a gaming establishment or a representative of a gaming establishment;

lvi. any suitable event which occurs in association with a player's gaming experience; and/or lvii. any suitable non-event (i.e., a lack of an event) which does not occur in association with a player's gaming experience.

In another embodiment, the gaming system dynamically configures the input devices to be associated with whichever game is currently displayed to draw the player's attention. For example, if at a first point in time, the configuration of the display device is that a blackjack game is displayed to draw the player's attention (i.e., the blackjack game is highlighted or displayed as a larger game relative to the other simultaneously played game), the gaming system configures the input devices to be associated with the blackjack game. In this example, if at a second, subsequent point in time, the configuration of the display device is that a keno game is displayed to draw the player's attention (i.e., the keno game is highlighted or displayed as a larger game relative to the other simultaneously played game), the gaming system configures the input devices to be associated with the keno game.

In another embodiment, the gaming system utilizes one or more secondary device management applications to configure one or more secondary devices. In one such embodiment, the gaming system dynamically configures one or more secondary devices, such as any light rings or top boxes to be associated with whichever game is currently displayed to draw the player's attention. For example, if at a first point in time, the configuration of the display device is that a bingo game is displayed to draw the player's attention (i.e., the bingo game is highlighted or displayed as a larger game relative to the other simultaneously played game), the gaming system configures one or more secondary devices to be associated with the bingo game. In this example, if at a second, subsequent point in time, the configuration of the display device is that a triggered secondary game is displayed to draw the player's attention (i.e., the triggered secondary game is highlighted or displayed as a larger game relative to the other simultaneously played game), the gaming system configures one or more of the secondary devices to be associated with the triggered secondary game. It should be appreciated that various resources, such as video, sound, buttons, memory, processors and/or memory storage, can be shared when multiple games are simultaneously played.

In another embodiment, independent of any display reconfiguration event, the gaming system enables a player to select which of the plurality of simultaneously played games will be allocated a greater portion of the displayed game play area. For example, if a first game is currently minimized but the player wants to view the first game in more detail, the gaming system enables the player to touch an area of the display device associated with the first game to increase the size of the first game (and decrease the size of one or more other games that are currently occupying a greater portion of the game play area). In another embodiment, independent of any display reconfiguration event, the central server communicates information or messages to redefine or reconfigure the game play area of the display device.

In another embodiment, the gaming system prioritizes the display reconfiguration events to determine the configuration of the display device when two or more display reconfiguration events occur simultaneously or substantially simultaneously. In one embodiment, the gaming system enables the player to input or select the priority of the display reconfiguration event. In one such embodiment, the gaming system saves or stores the player's inputted priority information in association with the player tracking system described above. In these embodiments, the gaming system enables the player to rank the events into a hierarchy followed by the gaming system to prioritize the display reconfiguration events to determine how the plurality of simultaneously played games will be displayed to the player. For example, if two display reconfiguration events overlap and each display reconfiguration event is associated with a different simultaneously played game being allocated an increased portion of the displayed game play area, the gaming system determines that, based on one or more stored priorities, the simultaneously played game associated with the larger wager amount is allocated the increased portion of the displayed game play area.

In another embodiment, the gaming system enables a player to selectively disable the reconfiguration of how the plurality of simultaneously played games are displayed to the player. In another embodiment, the gaming system enables a player to disable the reconfiguration of how the plurality of simultaneously played games are displayed for one or more display reconfiguration events and enable the reconfiguration of how the plurality of simultaneously played games are displayed for one or more other display reconfiguration events. In one such embodiment, the gaming system utilizes an override button to enable the player to disable or override a reconfiguration of how the plurality of games are displayed (in response to a display reconfiguration event occurring). In another such embodiment, the gaming system enables a player to prioritize which display reconfiguration events the gaming system should reconfigure how the plurality of games are displayed (when such display reconfiguration events occur) and which display reconfiguration events the gaming system should not reconfigure how the plurality of games are displayed (when such display reconfiguration events occur). In this embodiment, the gaming system saves or stores the player's inputted enable/disable display reconfiguration event information in association with the player tracking system described above. For example, the gaming system enables the player to: (i) designate that any display reconfiguration events of winning an award over a designated amount are enabled (i.e., the gaming system will cause a reconfiguration of how the plurality of games are displayed to the player in response to this display reconfiguration event occurring) and (ii) designate that any display reconfiguration events of winning an award less than the designated amount are disabled (i.e., the gaming system will not cause a reconfiguration of how the plurality of games are displayed to the player in response to this display reconfiguration event occurring).

In another embodiment, if a display reconfiguration event occurs, the gaming system reconfigures how the plurality of simultaneously played games are displayed to the player for a designated period of time and then reverts back to how the games were displayed to the player prior to the occurrence of the display reconfiguration event. That is, if an event occurs in the play of one of the games that requires the player's attention or focus, the gaming system temporarily reconfigures how the games are displayed to the player to draw the player's attention or focus to that one game. For example, if the gaming system is currently displaying a community poker game as the predominate game on the displayed game play area (i.e., the community poker game is allocated a larger portion of the displayed game play area than any other game being played) and a winning outcome is generated in a play of a slot game, the gaming system will: (i) reallocate a larger portion of the displayed game play area to the slot game (and thus reallocate a smaller portion of the displayed game play area to the community poker game) for a designated period of time, such as three seconds, and then (ii) reallocate the larger portion of the displayed game play area back to the community poker game (and thus reallocate a smaller portion of the displayed game play area back to the slot game).

In another embodiment, a display reconfiguration event occurs independent of any displayed event in any play of any of the displayed games. That is, the gaming system designates one or more events which are not displayed in any plays of any games (i.e., a mystery event) as display reconfiguration events. In another embodiment, a display reconfiguration event occurs at least partially based on a game triggered event, such as at least partially based on a play of one of the displayed games.

In another embodiment, rather than utilizing only one display device as described above, the gaming system utilizes a plurality of display devices and varies which game (or other aspects associated with which game) is displayed on which display device based on which game has a slow game cycle and which game has a fast game cycle. For example, a first, slow playing game, such as a slot game, takes 3 seconds to play while a second, slow playing game, such as a racing game, takes 90 seconds to play. In this example, the gaming system displays the slow playing game on the top or secondary display device while the primary or bottom display device switches between displaying the fast playing game and the betting controls of the slow playing game. This provides that the player only interacts with the primary or bottom display device which is easier for the player to reach (compared to the top or secondary display device). This further provides that only the primary or bottom display device is required to be associated with a touch screen as described herein.

It should be appreciated that in different embodiments, one or more of:
i. which events of which games qualify as display reconfiguration events;
ii. which games are associated with one or more display reconfiguration events;
iii. a quantity of display reconfiguration events associated a game;
iv. which displayed configuration of a plurality of simultaneously played games is associated with a display reconfiguration event;
v. a quantity of displayed configurations associated with a display reconfiguration event;
vi. how a modification of a displayed configuration of a plurality of simultaneously played games is displayed to a player;
vii. which indicators (i.e., highlighting a game, blurring out a game, moving a location of a game) are utilized to modify how a plurality of simultaneously played games are displayed to a player;
viii. a quantity of indicators utilized to modify how a plurality of simultaneously played games are displayed to a player;
ix. an amount of the display game play area associated with a game of a display configuration;
x. if a display reconfiguration event occurs;
xi. a quantity of games simultaneously played by a player;
xii. which games are available to be simultaneously played by a player;
xiii. a priority of two or more display reconfiguration events overlapping in occurrence;
xiv. which input devices are associated with which games for which displayed configurations of a plurality of simultaneously played games;
xv. which secondary devices are associated with which games for which displayed configurations of a plurality of simultaneously played games;
xvi. if a player enabled to switch the displayed configuration of a plurality of simultaneously played games;
xvii. which displayed configurations of a plurality of simultaneously played games is the player enabled to utilize; and/or
xviii. any determination disclosed herein;
is/are predetermined, randomly determined, randomly determined based on one or more weighted percentages, determined based on a generated symbol or symbol combination, determined based on a random determination by the central controller, determined based on a random determination at the gaming system, determined based on a player's selection, determined based on one or more side wagers placed, determined based on the player's primary game wager, determined based on time (such as the time of day), determined based on an amount of coin-in accumulated in one or more pools, determined based on a status of the player (i.e., a player tracking status), or determined based on any other suitable method or criteria.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:
a display device;
at least one input device;
at least one processor; and
at least one memory device which stores a plurality of instructions, which when executed by the at least one processor, cause the at least one processor to operate with the display device and the at least one input device to:
(a) at a first point in time and prior to an occurrence of any display reconfiguration event, display a first configuration of a plurality of simultaneously played games, said first configuration including a first game displayed in association with a first portion of a game play area and a second game displayed in association with a second, different portion of the game play area, said first portion of the game play area being greater than the second portion of the game play area;

(b) at a second, subsequent point in time after the occurrence of a display reconfiguration event associated with the second game, display a second configuration of the plurality of simultaneously played games, said second configuration including the first game displayed in association with the second portion of the game play area and the second game displayed in association with the first portion of the game play area; and (c) independent of any displayed configurations of the plurality of simultaneously played games, for each of the simultaneously played games:
(i) generate an outcome,
(ii) display the generated outcome, and
(iii) provide the player any award associated with the generated outcome.

2. The gaming system of claim 1, wherein the display reconfiguration event associated with the second game is selected from the group consisting of: a request for the player to place a wager in association with the play of the second game, a request for the player to make an input in association with the play of the second game, a display of the generated outcome of the second game, a display of any award associated with the generated outcome of the second game.

3. The gaming system of claim 1, wherein when executed by the at least one processor, the plurality of instructions cause the at least one processor to enable the player to select the display reconfiguration event associated with the second game from the group consisting of: a request for the player to place a wager in association with the play of the second game, a request for the player to make an input in association with the play of the second game, a display of the generated outcome of the second game, a display of a designated generated outcome of the second game, a display of any award associated with the generated outcome of the second game and a display of a designated award associated with the generated outcome of the second game.

4. The gaming system of claim 1, wherein when executed by the at least one processor at a third point in time, after the occurrence of a display reconfiguration event associated with the first game, the plurality of instructions cause the at least one processor to display the first configuration of the plurality of simultaneously played games.

5. The gaming system of claim 4, wherein the display reconfiguration event associated with the first game is selected from the group consisting of: a request for the player to place a wager in association with the play of the first game, a request for the player to make an input in association with the play of the first game, a display of the generated outcome of the first game, a display of any award associated with the generated outcome of the first game.

6. The gaming system of claim 1, wherein the first portion of the game play area is associated with a displayed focal point of the plurality of simultaneously played games.

7. The gaming system of claim 1, wherein the first game is associated with a first average duration for a complete play of the first game and the second game is associated with a second, greater average duration for a complete play of the second game.

8. The gaming system of claim 7, wherein the first game is played by one player and the second player is played by a plurality of players.

9. The gaming system of claim 1, wherein when executed by the at least one processor after the occurrence of the display reconfiguration event associated with the second game, the plurality of instructions cause the at least one processor to: (i) display the second configuration of the plurality of simultaneously played games for a designated period of time, and (ii) after the designated period of time, display the first configuration of the plurality of simultaneously played games.

10. The gaming system of claim 1, wherein:
(i) the first configuration is associated with the first game displayed at a first location of the game play area and the second game displayed at a second, different location of the game play area; and
(ii) the second configuration is associated with the second game displayed at the first location of the game play area and the first game displayed at the second, location of the game play area.

11. A method of operating a gaming system, said method comprising:
(a) at a first point in time and prior to an occurrence of any display reconfiguration event, causing a display device to display a first configuration of a plurality of simultaneously played games, said first configuration including a first game displayed in association with a first portion of a game play area and a second game displayed in association with a second, different portion of the game play area, said first portion of the game play area being greater than the second portion of the game play area;
(b) at a second, subsequent point in time after the occurrence of a display reconfiguration event associated with the second game, causing the display device to display a second configuration of the plurality of simultaneously played games, said second configuration including the first game displayed in association with the second portion of the game play area and the second game displayed in association with the first portion of the game play area; and
(c) independent of any displayed configurations of the plurality of simultaneously played games, for each of the simultaneously played games:
(i) causing at least one processor to execute a plurality of instructions to generate an outcome,
(ii) causing the display device to display the generated outcome, and
(iii) providing the player any award associated with the generated outcome.

12. The method of claim 11, wherein the display reconfiguration event associated with the second game is selected from the group consisting of: a request for the player to place a wager in association with the play of the second game, a request for the player to make an input in association with the play of the second game, a display of the generated outcome of the second game, a display of any award associated with the generated outcome of the second game.

13. The method of claim 11, which includes enabling the player to select the display reconfiguration event associated with the second game from the group consisting of: a request for the player to place a wager in association with the play of the second game, a request for the player to make an input in association with the play of the second game, a display of the generated outcome of the second game, a display of a designated generated outcome of the second game, a display of any award associated with the generated outcome of the second game and a display of a designated award associated with the generated outcome of the second game.

14. The method of claim 11, which includes causing the display device to display the first configuration of the plurality of simultaneously played games at a third point in time after the occurrence of a display reconfiguration event associated with the first game.

15. The method of claim 14, wherein the display reconfiguration event associated with the first game is selected from the group consisting of: a request for the player to place a wager in association with the play of the first game, a request for the player to make an input in association with the play of the first game, a display of the generated outcome of the first game, a display of any award associated with the generated outcome of the first game.

16. The method of claim 11, wherein the first portion of the game play area is associated with a displayed focal point of the plurality of simultaneously played games.

17. The method of claim 11, wherein the first game is associated with a first average duration for a complete play of the first game and the second game is associated with a second, greater average duration for a complete play of the second game.

18. The method of claim 17, wherein the first game is played by one player and the second player is played by a plurality of players.

19. The method of claim 11, which includes, after the occurrence of the display reconfiguration event associated with the second game, causing the display device to: (i) display the second configuration of the plurality of simultaneously played games for a designated period of time, and (ii) after the designated period of time, display the first configuration of the plurality of simultaneously played games.

20. The method of claim 11, wherein:
(i) the first configuration is associated with the first game displayed at a first location of the game play area and the second game displayed at a second, different location of the game play area; and
(ii) the second configuration is associated with the second game displayed at the first location of the game play area and the first game displayed at the second, location of the game play area.

21. The method of claim 11, which is provided through a data network.

22. The method of claim 21, wherein the data network is the internet.

23. A non-transitory computer readable medium including a plurality of instructions, which when executed by at least one processor, cause the at least one processor to:
(a) at a first point in time and prior to an occurrence of any display reconfiguration event, cause a display device to display a first configuration of a plurality of simultaneously played games, said first configuration including a first game displayed in association with a first portion of a game play area and a second game displayed in association with a second, different portion of the game play area, said first portion of the game play area being greater than the second portion of the game play area;
(b) at a second, subsequent point in time after the occurrence of a display reconfiguration event associated with the second game, cause the display device to display a second configuration of the plurality of simultaneously played games, said second configuration including the first game displayed in association with the second portion of the game play area and the second game displayed in association with the first portion of the game play area; and
(c) independent of any displayed configurations of the plurality of simultaneously played games, for each of the simultaneously played games:
(i) generate an outcome,
(ii) causing the display device to display the generated outcome, and
(iii) provide the player any award associated with the generated outcome.

24. The non-transitory computer readable medium of claim 23, wherein the display reconfiguration event associated with the second game is selected from the group consisting of: a request for the player to place a wager in association with the play of the second game, a request for the player to make an input in association with the play of the second game, a display of the generated outcome of the second game, a display of any award associated with the generated outcome of the second game.

25. The non-transitory computer readable medium of claim 23, wherein when executed by the at least one processor, the plurality of instructions cause the at least one processor to enable the player to select the display reconfiguration event associated with the second game from the group consisting of: a request for the player to place a wager in association with the play of the second game, a request for the player to make an input in association with the play of the second game, a display of the generated outcome of the second game, a display of a designated generated outcome of the second game, a display of any award associated with the generated outcome of the second game and a display of a designated award associated with the generated outcome of the second game.

26. The non-transitory computer readable medium of claim 23, wherein when executed by at least one processor, the plurality of instructions cause the at least one processor to cause the display device to display the first configuration of the plurality of simultaneously played games at a third point in time after the occurrence of a display reconfiguration event associated with the first game.

27. The non-transitory computer readable medium of claim 26, wherein the display reconfiguration event associated with the first game is selected from the group consisting of: a request for the player to place a wager in association with the play of the first game, a request for the player to make an input in association with the play of the first game, a display of the generated outcome of the first game, a display of any award associated with the generated outcome of the first game.

28. The non-transitory computer readable medium of claim 23, wherein the first portion of the game play area is associated with a displayed focal point of the plurality of simultaneously played games.

29. The non-transitory computer readable medium of claim 23, wherein the first game is associated with a first average duration for a complete play of the first game and the second game is associated with a second, greater average duration for a complete play of the second game.

30. The non-transitory computer readable medium of claim 29, wherein the first game is played by one player and the second player is played by a plurality of players.

31. The non-transitory computer readable medium of claim 23, wherein when executed by the at least one processor after the occurrence of the display reconfiguration event associated with the second game, the plurality of instructions cause the at least one processor to: (i) display the second configuration of the plurality of simultaneously played games for a designated period of time, and (ii) after the designated period of time, display the first configuration of the plurality of simultaneously played games.

32. The non-transitory computer readable medium of claim 23, wherein:
  (i) the first configuration is associated with the first game displayed at a first location of the game play area and the second game displayed at a second, different location of the game play area; and
  (ii) the second configuration is associated with the second game displayed at the first location of the game play area and the first game displayed at the second, location of the game play area.

* * * * *

UNITED STATES PATENT AND TRADEMARK OFFICE
CERTIFICATE OF CORRECTION

PATENT NO. : 8,333,657 B1
APPLICATION NO. : 13/245264
DATED : December 18, 2012
INVENTOR(S) : Dwayne R. Nelson et al.

It is certified that error appears in the above-identified patent and that said Letters Patent is hereby corrected as shown below:

IN THE CLAIMS

In Claim 1, Column 31, Line 1, replace "the" with --an--.
In Claim 1, Column 31, Line 15, replace the first instance of "the" with --a--.
In Claim 2, Column 31, Line 22, replace "a" with --the--.
In Claim 2, Column 31, Line 23, between "game," and "a" insert --and--.
In Claim 3, Column 31, Line 32, replace "a" with --the--.
In Claim 4, Column 31, Line 39, replace the second instance of "the" with --an--.
In Claim 5, Column 31, Line 49, replace "a" with --the--.
In Claim 5, Column 31, Line 50, between "game," and "a" insert --and--.
In Claim 8, Column 31, Line 61, replace "second player" with --second game--.
In Claim 10, Column 32, Line 12, between "second," and "location" insert --different--.
In Claim 11, Column 32, Line 26, replace "the" with --an--.
In Claim 11, Column 32, Line 42, replace the first instance of "the" with --a--.
In Claim 12, Column 32, Line 49, replace "a" with --the--.
In Claim 12, Column 32, Line 50, between "game," and "a" insert --and--.
In Claim 13, Column 32, Line 57, replace "a" with --the--.
In Claim 14, Column 32, Line 66, replace "the" with --an--.
In Claim 15, Column 33, Line 6, replace "a" with --the--.
In Claim 15, Column 33, Line 7, between "game," and "a" insert --and--.
In Claim 18, Column 33, Line 19, replace "second player" with --second game--.
In Claim 20, Column 33, Line 36, between "second," and "location" insert --different--.
In Claim 23, Column 33, in the line following Line 55, replace "the" with --an--.
In Claim 23, Column 34, Line 2, replace "causing" with --cause--.
In Claim 23, Column 34, Line 4, replace the first instance of "the" with --a--.
In Claim 24, Column 34, Line 11, replace "a" with --the--.
In Claim 24, Column 34, Line 12, between "game," and "a" insert --and--.
In Claim 25, Column 34, Line 23, replace "a" with --the--.
In Claim 26, Column 34, Line 35, replace "the occurrence" with --an occurrence--.

Signed and Sealed this
Second Day of April, 2013

Teresa Stanek Rea
*Acting Director of the United States Patent and Trademark Office*

CERTIFICATE OF CORRECTION (continued)
U.S. Pat. No. 8,333,657 B1

IN THE CLAIMS

In Claim 27, Column 34, Line 43, replace "a" with --the--.
In Claim 27, Column 34, Line 44, between "game," and "a" insert --and--.
In Claim 30, Column 34, Line 57, replace "second player" with --second game--.
In Claim 32, Column 36, Line 3, between "second," and "location" insert --different--.